United States Patent
DeGeorge et al.

(10) Patent No.: US 6,344,490 B1
(45) Date of Patent: Feb. 5, 2002

(54) REMOVABLE FILTER FOR SLURRY HYDROCARBON SYNTHESIS PROCESS

(75) Inventors: Charles W. DeGeorge, Chester, NJ (US); Barry J. Thompson, Artarmon (AU)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/236,151

(22) Filed: Jan. 22, 1999

(51) Int. Cl.⁷ .......................... C07C 27/00; C10G 17/00
(52) U.S. Cl. ........................ 518/700; 208/177
(58) Field of Search ............... 518/700; 208/177

(56) References Cited

U.S. PATENT DOCUMENTS

| | | | |
|---|---|---|---|
| 1,771,928 A | 7/1930 | Jung | |
| 4,237,011 A | 12/1980 | Acosta | 210/237 |
| 4,405,466 A | 9/1983 | Giannelli et al. | 210/798 |
| 5,422,375 A | * 6/1995 | Rytter et al. | 518/700 |
| 5,811,469 A | 9/1998 | Leviness et al. | 518/700 |

FOREIGN PATENT DOCUMENTS

| | | | |
|---|---|---|---|
| DE | 3233726 | 3/1984 | B01J/8/00 |
| EP | 0609079 | 8/1994 | B01J/8/22 |
| EP | 682971 | 11/1995 | B01D/46/24 |
| GB | 039317 | 8/1966 | |

* cited by examiner

Primary Examiner—Sreeni Padmanabhan
Assistant Examiner—J. Parsa
(74) Attorney, Agent, or Firm—Jay Simon; Charles Brumlik; Kenneth W. Peist

(57) ABSTRACT

A removable filter for separating and filtering slurry liquid from solid particles includes one or more filter sections connected by a filtrate conduit. Each section comprises a plurality of vertical, hollow, sintered metal filter elements horizontally arranged across a manifold connected to a hollow filtrate conduit. The sections are vertically stacked and connected by the conduit(s) to form the filter which is removably secured in the slurry by means which permit it to be removed vertically up and out of the top of the reactor. This filter has a high surface area to volume ratio and is useful for removing the liquid hydrocarbon products from a slurry hydrocarbon synthesis reactor and can easily be replaced without having to drain out the slurry.

8 Claims, 2 Drawing Sheets

REMOVABLE FILTER FOR SLURRY HYDROCARBON SYNTHESIS PROCESS

BACKGROUND OF THE INVENTION

Field of the Invention

The invention relates to a filter useful for separating liquid from solid particles. More particularly, the invention comprises a removable filter which comprises vertically arrayed and manifolded filter sections connected to a common filtrate collector, useful for separating liquid hydrocarbon product from a Fischer-Tropsch hydrocarbon synthesis slurry comprising catalyst particles in a hydrocarbon liquid, and to a hydrocarbon synthesis process employing same. Each filter section comprises a plurality of elongated, vertically disposed and hollow filter elements attached to and horizontally spaced across a manifold, with the manifolds connected to a filtrate conduit for removing the hydrocarbon liquid from the slurry.

Background of the Disclosure

Slurry hydrocarbon synthesis (HCS) processes are known. In a slurry HCS process a synthesis gas (syngas) comprising a mixture of $H_2$ and CO is bubbled up as a third phase through a slurry in a reactor in which the slurry liquid comprises hydrocarbon products of the synthesis reaction and the dispersed, suspended solids comprise a suitable Fischer-Tropsch type hydrocarbon synthesis catalyst. Reactors which contain such a three phase slurry are sometimes referred to as "bubble columns", as is disclosed in U.S. Pat. No. 5,348,982. Irrespective of whether the slurry reactor is operated as a dispersed or slumped bed, the mixing conditions in the slurry will typically be somewhere between the two theoretical conditions of plug flow and back mixed. The catalyst particles are typically kept dispersed and suspended in the liquid by the lifting action of the syngas bubbling up through the slurry and by hydraulic means. Mechanical means such as impellers and propellers and the like are not used, because they will quickly erode and also cause attrition of the catalyst particles. One or more vertical, gas disengaging downcomers may be used as hydraulic means to assist in maintaining more uniform catalyst dispersion, by providing a vertical catalyst circulation in the slurry, as is disclosed in U.S. Pat. No. 5,382,748. The slurry liquid comprises the liquid hydrocarbon products of the HCS reaction and must be separated from the catalyst particles and removed from the reactor for further processing and upgrading. This is typically accomplished by mechanical filtration in which the slurry is fed to one or more filters, either inside the slurry in the reactor or outside the reactor, which permit the liquid to pass through, but not the catalyst particles. U.S. Pat. No. 5,527,473 and patent publications EP 0609079, WO 93/16796 and WO 94/16807 all relate to helically wound wedge wire filters and the like, while WO 93/16795 discloses vertical or helically wound fine metal threads or sintered metal. Magnetically assisted filtration has also been disclosed. Notwithstanding the disclosures of the prior art, there is still a need for an efficient and easily replaceable filter which can be immersed in the slurry.

SUMMARY OF THE INVENTION

The present invention relates to a process and filter means for separating particulate solids from a liquid and is useful in a hydrocarbon synthesis (HCS) process. The slurry comprises gas bubbles and particulate solids in a slurry liquid. The filter means comprises a filter which includes at least one filter section which comprises a plurality of hollow filter elements disposed on a manifold connected to a filtrate conduit, for removing liquid from a slurry which comprises particulate solids dispersed in a liquid. In the process of the invention the filter, containing one or more filter sections, is immersed in the slurry, the interior of the filter elements, manifold or manifolds and conduit are all in fluid communication and the filter elements are permeable to the slurry liquid, but not the particulate solids. The filter and process of the invention are useful for separating and removing slurry hydrocarbon liquid from a three phase, Fischer-Tropsch type hydrocarbon synthesis slurry, either inside the slurry reactor or outside the reactor in a separate vessel. In one embodiment, each one or more sections of the filter comprise a plurality of filter elements vertically disposed and horizontally arrayed or arranged across the horizontal surface of a respective manifold which is connected to a common filtrate conduit. The filter elements comprise elongated, hollow tubes or pipes made of a liquid permeable material but impermeable to the passage of the solids therethrough. This is readily achieved by the use of pipes or tubes made of sintered metal. Thus, the wall of the hollow cylindrical elements is permeable to the hydrocarbon liquid, but not the catalyst particles. In a preferred embodiment the filter is vertically and removably secured in the slurry in the slurry HCS reactor (or in an external filtration vessel) by suitable means, such as being suspended from the top of the reactor, so that the filter hangs down in the slurry and can be removed vertically overhead through a nozzle or other orifice in the top of the reactor. This permits facile removal and replacement of the filter, without having to remove the slurry from the reactor or separate filtration vessel. The use of a plurality of liquid permeable filter elements in the form of hollow cylinders, closed at one end with the other end opening into the supporting manifold, enables a very high filtration surface area to be achieved, while occupying minimal space inside the reactor. This can be expressed as the ratio of the filtration area to the volume occupied by the filter in the slurry, or area to volume (A/V) ratio. The filter of the invention will have an A/V of at least 4.3 $ft^{-1}$ and preferably at least 5.9 $ft^{-1}$. Therefore, in one aspect the invention relates to (i) a filter having these A/V ratios and (ii) a slurry reactor and process, and particularly an HCS slurry reactor and process, employing at least one filter having such A/V ratios for separating the slurry liquid from the particulate solids in the slurry, either in the reactor itself or in a separate vessel. Thus, in another embodiment the invention relates to a slurry reactor, and particular slurry HCS reactor, containing at least one filter for separating slurry liquid from solid particles in the slurry, wherein the filter is removably secured in the reactor by means which permit removal of the filter vertically upward and out the top of the reactor. With specific regard to a slurry hydrocarbon synthesis process for forming hydrocarbons, at least a portion of which are liquid, the invention comprises:

(a) reacting a synthesis gas comprising a mixture of $H_2$ and CO in the presence of a solid, particulate hydrocarbon synthesis catalyst in a slurry in a hydrocarbon synthesis reactor at reaction conditions effective to form hydrocarbons, at least a portion of which are liquid at said reaction conditions, wherein said slurry comprises said catalyst and gas bubbles in a hydrocarbon slurry liquid, and wherein said slurry hydrocarbon liquid comprises said liquid hydrocarbons;

(b) contacting said slurry with a filter comprising at least one filter section which includes a plurality of hollow filter elements arrayed across a manifold connected to a filtrate conduit, with the interior of the elements, manifold and conduit in fluid communication, and wherein the wall separating the interior of the elements from the slurry is permeable to said slurry hydrocarbon liquid but not said slurry solids;

(c) passing said slurry hydrocarbon liquid through said filter element walls and into said interior of said elements as a filtrate and then successively passing said filtrate through the interior of said manifold and said filtrate conduit, and (d) passing said filtrate from said conduit out of said reactor.

The hydrocarbon liquid filtrate removed from the slurry is then typically upgraded to more valuable product by fractionation and/or one or more conversion operations, or sold neat. The slurry or slurry body in which the filter is immersed may be the reactive slurry in the HCS reactor or it may be a slurry body in an external filtration zone. The HCS reactor will typically be operating during filtration and the filtration may be continuous or intermittent. If the HCS reactor is on line and operating to produce hydrocarbons, filtering the hydrocarbon liquids and passing them out of the reactor in the process of the invention does not disturb or interfere with the HCS reactions. In one embodiment in which the filter is immersed in a slurry in a filtration vessel external of the HCS reactor, it is advantageous to feed slurry from the reactor to the external vessel via a solids reducing downcomer, so that the slurry from which the hydrocarbon liquids are being separated from the catalyst particles and withdrawn from the filtration vessel have a reduced solids content compared to the slurry in the HCS reactor. In the practice of the invention in which sintered metal is used as the actual filtration medium, it is possible to have a pore size of less than one micron. This means that essentially no solids (other than extremely small fines) pass through the filtration medium with the hydrocarbon liquid. In yet another embodiment, hydrogen or a hydrogen containing gas is fed into the external filtration unit or vessel to prevent catalyst deactivation. While the process and means of the invention are described herein with particular reference to their usefulness in association with a slurry HCS process, the invention is not intended to be so limited.

DETAILED DESCRIPTION

Figures 1A, 1B:
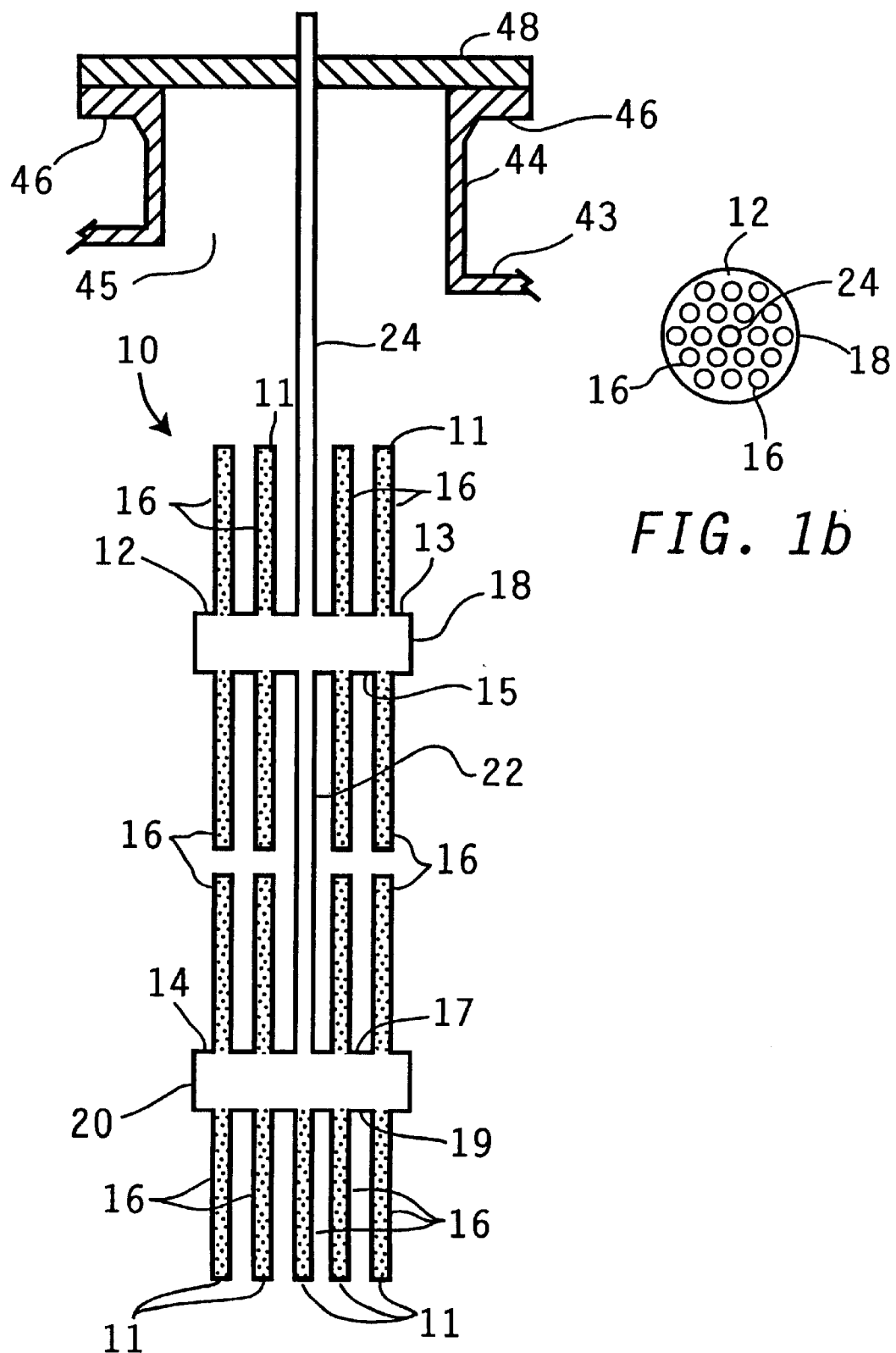
FIGS. 1(a) and 1(b) schematically illustrate a cross-sectional and a top plan view of a filter of the invention.

In a Fischer-Tropsch slurry HCS process, a syngas comprising a mixture of $H_2$ and CO is bubbled up into a reactive slurry in which it is catalytically converted into hydrocarbons and preferably liquid hydrocarbons. The mole ratio of the hydrogen to the carbon monoxide may broadly range from about 0.5 to 4, but which is more typically within the range of from about 0.7 to 2.75 and preferably from about 0.7 to 2.5. The stoichiometric mole ratio for a Fischer-Tropsch HCS reaction is 2.0, but there are many reasons for using other than a stoichiometric ratio as those skilled in the art know and a discussion of which is beyond the scope of the present invention. In a slurry HCS process the mole ratio of the $H_2$ to CO is typically about 2.1:1/1. The slurry liquid in the reactor comprises the hydrocarbon products produced by the hydrocarbon synthesis reaction conditions which are liquid at the reaction conditions. A long standing problem has been the efficient separation and removal of the slurry hydrocarbon liquid product produced in the reactor from the relatively fine catalyst particles. The elevated temperature and pressure in the reactor and the waxy nature of the reaction hydrocarbon products make conventional particulate separation and filtration methods unsuitable for use in a slurry type hydrocarbon synthesis process. Thus, cyclone separation which has found such widespread use for separating catalyst particles from product vapors in cat cracking processes, is unsuitable for use with a waxy slurry, as are rotary and centrifuge filters.

While the temperature and pressure in the slurry can vary widely depending on the Particular catalyst used and products desired, typical conditions effective to form hydrocarbons comprising mostly $C_{5+}$ paraffins, (e.g., $C_{5+}-C_{200}$) and preferably $C_{10+}$ paraffins, in a slurry HCS process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (0° C., 1 atm) per hour per volume of catalyst, respectively. The slurry typically contains from about 10 wt. % to 70 wt. % catalyst solids, more typically from 30 wt. % to 60 wt. % and in some embodiments 40 wt. % to 55 wt. % is preferred. As mentioned above, the slurry liquid comprises the hydrocarbon products which are liquid at the reaction conditions, along with minor amounts of other components. While catalyst particle sizes may broadly range from as small as 1 to as large as 200 microns, a typical conventional Fe or supported iron catalyst will have a mean particle size of about 22 microns, while a catalyst comprising a catalytic metal such as cobalt composited with or supported on titania will typically have a mean particle size of about 63 microns. However, such catalysts will also include fine particles as small as 1 micron and the constant agitation and mixing of the catalyst particles in the slurry results in particle size reduction through attrition. This also produces fines having a particle size of from about 1 to 10 microns. It is not possible to filter out such fine particles with the massive and bulky wound wire prior art filters. This results in some of the catalyst particles being withdrawn through these filters along with the hydrocarbon liquid and these particles must be removed before the hydrocarbon liquid product is sent to upgrading. Further, removing the prior art bulky filters from the reactor invariably means shutting down the reactor and draining the liquid out of it so that a clogged or damaged filter can be replaced or repaired. The drained liquid has to be sent to hot storage so that it does not solidify and then returned back into to the reactor hot enough to enable continuation of the HCS reaction.

The filter of the invention, which is schematically illustrated in FIGS. 1(a) and 1(b) has been found to be a facile solution to this well known problem. Thus, turning to FIGS. 1 (a) and 1(b), there is shown a filter of the invention 10 which comprises two filter sections 12 and 14 each comprising a disk-shaped, hollow manifold 18 and 20, respectively, with a plurality of vertically disposed, elongated filter elements 16 extending upward and downward from respective manifold upper and lower walls 13, 15,17 and 19. The filter elements, of which only a few are indicated for the sake of convenience, are elongated, hollow and closed at the free end 11. The other end of each filter element is fastened by suitable means such as welding, in mating engagement with an orifice or nozzle (not shown) on a respective manifold horizontal wall and opens into the interior of the manifold. The filter elements are pervious to the passage of the slurry fluid therethrough, but impervious to the passage of catalyst solids. The filter surface of the filter elements may be fabricated of spirally or straight would wedge wire and the like. However, it is a preferred embodiment of the invention that the filter elements be fabricated of sintered metal. Each element may be fabricated entirely of sintered metal or may comprise an outer portion of sintered metal supported on a metal frame or other support means. As shown in FIGS. 1(a) and 1(b), the filter is basically cylindrical and the manifolds are hollow disks or cylinders, each comprising a respective solid, liquid and gas impervious cylindrical outer wall 18 and 20, which terminate in their respective horizontal upper and lower wall portions on which the filter elements are arranged. The horizontal upper and lower wall portions are also solid and gas and liquid impervious. The filter elements comprise sintered metal hollow tubes laterally arranged and spaced apart from each other on the upper and/or lower horizontal manifold wall to which they are attached, with the hollow interior of the filter elements in fluid communication with the interior of their respective manifolds. The manifolds are connected by means of filtrate conduits 22 and 24 which are hollow tubes or pipes for collecting filtrate from inside the manifolds and passing it up and out the reactor or reaction zone. The use of a plurality of basically tubular filter elements vertically disposed and horizontally arranged on the manifold provides a large filtration surface area per unit volume of filter. While two filter sections are shown in FIG. 1(a), the actual number of sections making up the filter will be determined by the size of the reactor or filtration vessel, the size of the filter elements, etc., based on the needs and at the discretion of the practitioner. For example, FIG. 2 illustrates three filter sections.

As the Figures show, the filter is preferably suspended in the slurry from means located at the top of the reactor. By suspending the filter in the slurry from the top of the reactor, the filter is easily removed for repair and replacement without having to drain the reactor as is necessary with the prior art filters. If outboard filtration is employed wherein the slurry is fed to a vessel external to the main slurry reactor for liquid product removal by filtration, the filter is also preferably suspended from the top of the outboard filtration unit or zone for the same reasons. Referring to FIGS. 1(a) and 2, the filter is shown as suspended by means of the filtrate collection conduit 24 which extends through a nozzle 44 at the top 43 of the reactor 30. Nozzle 44 opens into an outwardly flaring flange 46, which supports a cover plate 48. The nozzle bore 45 is sized so that the filter can be pulled out the top once the cover plate has been unbolted. A new or repaired filter is simply lowered back into the slurry 34 in the reactor 30 and the plate rebolted. A flange seal (not shown) forms a hermetic seal between the top of the flange and the cover plate. In a further embodiment (not shown), instead of a filter element, a pipe, filter conduit closed at its bottom end, or a solid rod will extend down from the bottom center of the filter and fit into mating engagement into a sleeve or slip joint to permit vertical movement of the filter in the slurry. This permits the filter to expand and contract along its length, to accommodate changes in the temperature in the reactor. This also provides lateral support to prevent horizontal or lateral movement of the bottom of the filter, due to reactor vibration, so that the filter is anchored at both the top and bottom, yet is still able to contract and expand in a vertical direction. Lateral movement of the bottom of the filter can produce large bending moments which will break the filter, as well as causing additional damage inside the reactor by the filter hitting another filter, heat exchange tubes, downcomers and the like in the slurry. As set forth above, instead of a pipe or conduit, a rod or other similar means may extend down from the bottom center of the filter into a sleeve or slip joint. The filter is attached to the plate 48 by welding or by any other suitable means. Also not shown are means for anchoring and supporting the free ends of the filter elements attached to the manifolds, to minimize or prevent lateral movement from setting up bending moments which would break the elements, usually where they are joined to the manifolds. Such means can include annular shaped, open, wire cages or support structures having a plurality of interconnected rings and the like, which slip over the ends of the elements to prevent lateral movement, with the means themselves anchored to the manifolds, filter elements or filtrate conduits. The reason for this is that during the hydrocarbon synthesis reaction, the bubbling gas in the reactor results in the reactor vibrating. This means that the filter must be prevented from free lateral or bending movement to avoid damage to the and the other reactor internals. The filter elements must be sized so as not to have too large an aspect ratio of length to diameter. Otherwise excessive bending moments where the filter elements are welded to the manifolds could crack and otherwise damage the filter section and even render it permeable to catalyst solids at the point of damage. Finally, while the figures and description relate to filter assemblies, manifolds and elements having a circular cross-section, the invention is not intended to be so limited and other suitable shapes and sizes may be used.

Figure 2:
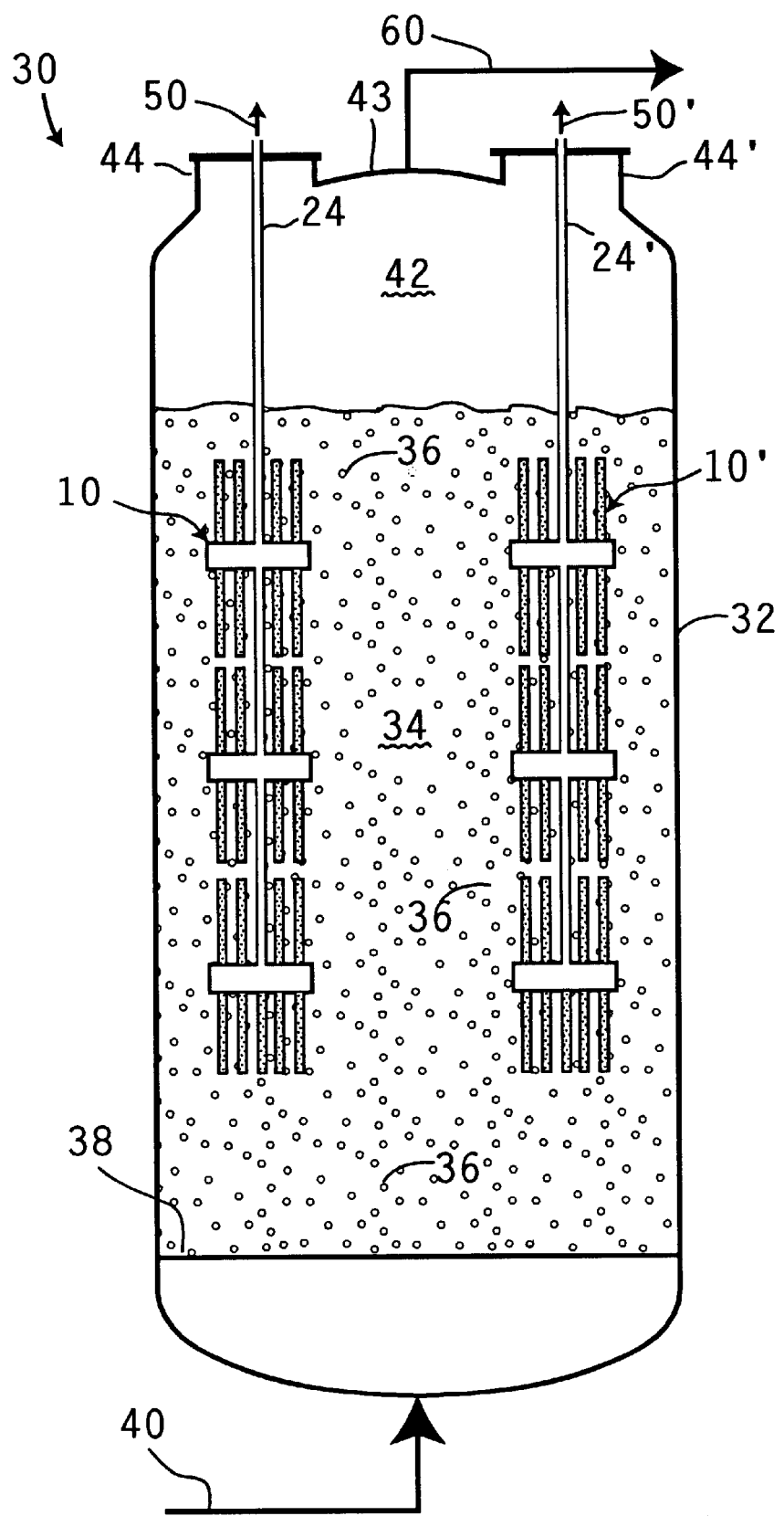
FIG. 2 schematically illustrates filter assemblies of the invention immersed in the slurry liquid in a slurry reactor.

Referring now to FIG. 2, a slurry type hydrocarbon synthesis reactor 30 is shown as comprising a cylindrical steel outer shell or vessel 32, containing a three phase slurry 34 within, which comprises hydrocarbon liquid in which catalyst particles are dispersed and suspended, and which also contains gas bubbles. The gas comprises synthesis gas and gas products of the Fischer-Tropsch type hydrocarbon synthesis reactions. Synthesis feed gas is introduced into the reactor, via line 40 and is injected up into the bottom of the slurry 34, by means of a plurality of gas distribution means, such as gas injectors (not shown), horizontally arranged across steel plate 38. Plate 38 is impervious to the slurry liquids, but is pervious to the upward flowing gas by virtue of the gas injectors. The synthesis gas flows up through the slurry 34 and is indicated by bubbles 36, of which merely a few are shown for convenience. The synthesis gas contacts the catalyst particles in the slurry and forms liquid and gas hydrocarbon products, along with significant amounts of water vapor. Two identical filter assemblies of the invention, 10 and 10', are shown suspended in slurry 34, each comprising three filter sections with each section containing eighteen filter elements (nineteen in the lower section), of which only a few are briefly illustrated for the sake of convenience. As the reaction proceeds, the gas products exit at the top of the slurry and pass overhead into a gas disengaging zone 42 from where they are removed from the reactor via line 60. At the same time, the slurry liquid passes into the interior of the sintered metal filter elements whose walls are porous and pervious to the flow of the slurry liquid, but which will not allow passage of the catalyst particles in the slurry into the interior of the filter elements, due to the extremely small size (e.g., <0.5 microns) of the pores. The pore size is catalyst specific and a pore size of <0.5 microns has been found adequate for a catalyst comprising Co supported or composited with titania. The slurry liquid passes into the interior of the filter elements as a filtrate and then into the interior of the manifolds with which the filter elements are in fluid communication. The filtrate passes from the manifolds into the filtrate conduits and is removed out the top of the reactor as indicated by arrows 50 and 50'. In FIG. 2, two filter assemblies of the invention are schematically shown as being suspended in the slurry from the top of the reactor, with the uppermost conduit of each, 24 and 24', exiting the top of the reactor. The filtrate is passed from the conduits to further processing and upgrading downstream.

A pressure differential across the filter elements in the reactor is sufficient to drive the slurry liquid into the filter elements, manifolds, conduits and out of the reactor to downstream processing. The reactor pressure is usually above 200 psi and the outlet pressure of the filtrate conduits typically less than 75 psi. This pressure differential is more than sufficient to operate the filters. However, sintered metal filter elements are fragile and in some cases it has been found that too large a pressure drop across the filter elements will crush and break them. In one instance, a pressure differential of about 250 psi across 1½ inch OD sintered metal filter elements in the slurry crushed them. The larger the diameter, the lower the pressure differential required to crush it. Accordingly, it forms a feature of the invention for the embodiment in which the filter elements are susceptible to being crushed by too large a pressure drop across the filter surface of the elements, that means be provided to prevent a pressure drop across the filter elements large enough to crush them. There are a number of ways of accomplishing this. One way is to regulate the pressure downstream of the filter assemblies to prevent it from falling to a value low enough for the higher pressure in the slurry to crush the filter elements. This may be accomplished by downstream pressure controllers. Periodic backwashing the filters in the slurry is necessary to clean the pores of the filter elements of fine particle size solids accumulated during filtration. All the filter assemblies can be backwashed at the same time or they can be backwashed individually, as experience has revealed no real difference between the two methods. Twelve hour intervals were found to be adequate with 1½ inch filter elements fabricated of stainless steel sintered metal tubing having the small <0.5 micron pore size. In one run in an experimental HCS reactor, particle-free (e.g., <1 ppm) filtrate was achieved at a filtration flux of 0.1 GPM/ft$^2$ for a catalyst containing slurry.

Another aspect of the invention resides in a substantially high area of filtration surface with respect to the volume occupied by the filter in the slurry, which enables a relatively high volumetric recovery of the hydrocarbon liquid filtrate, based on the space occupied by the filter in the slurry. This is particularly important if the filter is immersed in the slurry in the reactor and not in an outboard filtration vessel, due to the limited amount of space in the reactor. For example, in a filter similar to that illustrated in the Figures, each section comprises a cylindrical manifold having an upper and lower horizontal surface, across each of which are arrayed a plurality of hollow, cylindrical, substantially vertical sintered metal filter elements. In a case in which the elements have a diameter of one and one-half inch, are each ten feet long and disposed on the top and bottom surface of a six inch thick manifold fifteen inches in diameter, with the center position assumed to be occupied by a one and one-half inch diameter filtrate conduit and with a one and one-half inch spacing between elements, there will be a total of nineteen elements arranged in a triangular array with a sixty degree angle from center to center for adjacent elements. The L/D ratio (length divided by diameter) of the elements is 80, the volume occupied by the elements and manifold is 25 ft$^3$, the total filtration area is 149 ft$^2$ and the filter surface to filter volume ratio (A/V) is 5.9 ft$^{-1}$. In marked contrast, the A/V ratio for a single cylindrical filter twenty and one-half feet long and fifteen inches in diameter, such as those illustrated in the prior art, is only 3.1 ft$^{-1}$. Depending on the diameter of the filter elements, the diameter of the manifold and whether or not elements of different diameters are arrayed on the top and bottom of the manifold, the A/V ratio can range from 4.3 ft$^{-1}$ to as much or even more than 8 ft$^{-1}$. In a broad embodiment, the invention relates to a slurry process, and preferably a slurry HCS process in wherein at least one filter is disposed in the slurry either in the reactor or in the slurry in a vessel external of the reactor, and wherein the filter has a filtration area to filter volume ratio of at least 4.3 ft$^{-1}$ and preferably at least 5.9 ft$^{-1}$.

In an HCS process, liquid and gaseous hydrocarbon products are formed by contacting a syngas comprising a mixture of $H_2$ and CO, under shifting or non-shifting conditions and preferably under non-shifting conditions in which little or no water gas shift reaction occurs, particularly when the catalytic metal comprises Co, Ru or mixture thereof. Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. No. 4,568,663; 4,663,305; 4,542,122; 4,621,072 and 5,545,674.

The hydrocarbons produced by an HCS process according to the invention are typically upgraded to more valuable products, by subjecting all or a portion of the $C_{5+}$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. In a slurry hydrocarbon synthesis process for forming hydrocarbons wherein (a) a synthesis gas comprising a mixture of $H_2$ and CO is reacted in the presence of a solid, particulate hydrocarbon synthesis catalyst in a slurry in a hydrocarbon synthesis reactor at reaction conditions effective to form hydrocarbons, at least a portion of which are liquid hydrocarbons at the reaction conditions, wherein the slurry comprises the catalyst and gas bubbles comprising the synthesis gas in a slurry hydrocarbon liquid, and wherein the slurry hydrocarbon liquid comprises the liquid hydrocarbons, (b) the slurry is directly contacted with a filter having a separating wall encompassing an interior, (c) part of the slurry hydrocarbon liquid is passed through the separating wall and into the interior as a filtrate, and (d) the filtrate is passed from the interior out of the reactor; wherein the improvement comprises:

directly contacting the slurry with the filter which includes a plurality of hollow filter elements each having the separating wall encompassing the interior, arrayed across a manifold connected to a filtrate conduit, with the interior, the manifold, and the conduit in fluid communication, and wherein the separating wall is permeable to the slurry hydrocarbon liquid but not the slurry solids, and passing the filtrate out of the reactor by successively passing the filtrate from the interior, through the manifold, and through the filtrate conduit.

2. A process according to claim 1 wherein said filter is immersed in said slurry.

3. A process according to claim 2 wherein said filter is in either said reactor or in an external filtration vessel.

4. A process according to claim 3 wherein said filter has an area to volume ratio of at least 4.3 $ft^{-1}$.

5. A process according to claim 4 wherein said filter is removably secured in said reactor or vessel by means which permit it to be removed vertically upward and out the top of said reactor.

6. A process according to claim 5 wherein at least a portion of said filtrate is upgraded to more valuable product by fractionation and/or one or more conversion operations.

7. A process according to claim 6 wherein said filter has an area to volume ratio of at least 5.9 $ft^{-1}$.

8. A process according to claim 1 wherein at least a portion of said filtrate is upgraded to more valuable product by fractionation and/or one or more conversion operations.

* * * * *